(12) United States Patent
Hjelsand

(10) Patent No.: US 6,769,451 B2
(45) Date of Patent: Aug. 3, 2004

(54) POWER BEYOND STEERING UNIT WITH BYPASS

(75) Inventor: Timothy A. Hjelsand, Waconia, MN (US)

(73) Assignee: Eaton Corporation, Cleveland, OH (US)

( * ) Notice: Subject to any disclaimer, the term of this patent is extended or adjusted under 35 U.S.C. 154(b) by 317 days.

(21) Appl. No.: 10/124,024

(22) Filed: Apr. 17, 2002

(65) Prior Publication Data

US 2003/0196711 A1 Oct. 23, 2003

(51) Int. Cl.$^7$ .............................. B62D 5/083; F15B 9/10
(52) U.S. Cl. .................. 137/625.23; 60/384; 91/375 A
(58) Field of Search ............ 137/625.21, 625.22, 137/625.23, 625.24; 91/375 R, 375 A; 60/384

(56) References Cited

U.S. PATENT DOCUMENTS

| | | | | |
|---|---|---|---|---|
| 3,834,278 A | * | 9/1974 | Goff et al. ............... | 137/627.5 |
| 3,960,234 A | | 6/1976 | Morgan .................. | 180/132 |
| 3,996,838 A | | 12/1976 | Goff ....................... | 91/32 |
| 4,050,474 A | * | 9/1977 | Morgan .................. | 60/384 |
| 4,232,708 A | | 11/1980 | Miller ..................... | 137/625.21 |
| 4,262,580 A | * | 4/1981 | Goff et al. ............... | 91/375 A |
| 5,136,844 A | * | 8/1992 | Stephenson et al. ...... | 60/384 |

* cited by examiner

Primary Examiner—John Rivell
(74) Attorney, Agent, or Firm—L. J. Kasper (57) ABSTRACT

An open center fluid controller (15) controls the flow from a pump (11) to a steering cylinder (17) and to a downstream auxiliary device (99) requiring a predetermined minimum flow availability. The open center fluid controller (15) includes controller valving (19) having a neutral position (N) a normal operating position (R) and a maximum displacement position (R-M). The controller defines an auxiliary fluid path providing communication between an inlet port (31) and an auxiliary or power beyond port (87), which is in communication with the auxiliary device (99). The auxiliary fluid path includes a neutral variable orifice ($A_N$) having a decreasing flow area as the valving (19) is displaced toward the maximum displacement position (R-M). The valving defines an auxiliary flow control orifice ($A_A$) providing communication from the inlet port to the auxiliary port (87) when the valving approaches the maximum displacement position. The auxiliary flow control orifice ($A_A$) has a flow area operable to permit the predetermined minimum flow availability to the auxiliary device, even as a maximum steering operation (R-M) is taking place.

5 Claims, 6 Drawing Sheets

POWER BEYOND STEERING UNIT WITH BYPASS

BACKGROUND OF THE DISCLOSURE

The present invention relates to fluid controllers of the type used to control the flow of fluid from a source of pressurized fluid, such as a vehicle power steering pump, to a fluid pressure operated device, such as a vehicle steering cylinder.

In particular, the present invention relates to fluid controllers of the "open-center" type, i.e., those in which the valving, when it is in its neutral position, defines an open flow path from the inlet port to a port connected to a downstream fluid pressure operated auxiliary device. Thus, fluid controllers of this type are referred to as having "power beyond" capability, because they are able to communicate hydraulic power to another device on the vehicle which is downstream ("beyond"), relative to the SCU.

In a fluid controller of the open-center type, the valving typically defines a power beyond flow path from the inlet port to the power beyond port, this power beyond path including a neutral variable orifice ($A_N$) which has its largest flow area when the valving is in neutral, and a decreasing flow area as the valving is displaced from neutral. In addition, the controller valving defines a main fluid path communicating from the inlet port to a control (cylinder) port, the main fluid path including a main flow control (A1) orifice. The A1 orifice begins to open after several degrees of displacement (deflection) of the SCU valving, with the orifice area typically increasing with further valve deflection. In some open-center type units, the A1 orifice is always open, thus effectively comprising a "fixed" orifice, and it will be understood that references hereinafter, and in the appended claims, to a "first flow control orifice" can mean and include either a variable or a fixed A1 orifice.

As is well know to those skilled in the art of fluid controllers of the open-center type, pressure begins to build in the main fluid path as the neutral variable orifice ($A_N$) in the power beyond path gradually decreases in flow area, i.e., the power beyond path may be viewed somewhat as a "leak" in the main fluid path which needs to be closed off. Therefore, it has been common practice in such open-center, power beyond SCUs to completely close off the neutral orifice in the power beyond fluid path at a valve displacement somewhat less than the maximum valve displacement, in order to be able to generate as much steering pressure as possible when rotating the steering wheel at a maximum rate of rotation (which inherently results in maximum valve displacement).

Although such open-center, power beyond fluid controllers have been quite successful commercially, there has been one disadvantage inherent in such vehicle hydraulic systems. By way of example, on a commercial mower having an open-center SCU, and wherein the mower decks are raised hydraulically and constitute the "power beyond" hydraulic function, the overall vehicle system performance has been considered very acceptable. However, when the vehicle is being maneuvered in a series of tight turns, with the mower decks raised, if the vehicle operator rotates the steering wheel at a rate sufficient to displace the valving to its maximum displacement, the power beyond fluid path closes somewhat before the SCU valving reaches its maximum displacement. In the situation described, without pressurized flow from the power beyond port, the mower decks may move from their raised position to a lowered position at a time when such is not desirable. Thus, references hereinafter, and in the appended claims, to an auxiliary device "requiring a predetermined minimum flow availability" will be understood to mean and include situations of the type described above, in which is it is simply not desirable, from the viewpoint of either the vehicle OEM or the operator, for the auxiliary device to have pressurized flow thereto from the auxiliary port cut off when the SCU valving is in its maximum displacement position.

The problem described above has led the assignee of the present invention to include, for many years now, in its product brochure for open-center power beyond SCUs, a statement advising customers to avoid using auxiliary (power beyond) functions that require constant flow while the vehicle is being steered. This has been considered unfortunate because, for many vehicle applications, the potential customer may not be able to use a particular power beyond function in combination with an open-center SCU, even though such a combination would otherwise be ideal or at least, very desirable. Alternatively, the customer may decide to use such a combination anyway, but at the expense of periodically having the power beyond device lose power. Clearly, neither alternative is fully acceptable.

BRIEF SUMMARY OF THE INVENTION

Accordingly, it is an object of the present invention to provide an improved fluid controller of the open-center, power beyond type which is capable of overcoming the above-described disadvantages of the prior art device.

It is a more specific object of the present invention to provide such an improved fluid controller in which it is possible to maintain control over the downstream, auxiliary hydraulic devices even when the SCU is being operated at maximum valve displacement.

The above and other objects of the invention are accomplished by the provision of an open-center fluid controller operable to control the flow of fluid from a source of pressurized fluid to a fluid pressure operated priority device and to a downstream fluid pressure operated auxiliary device requiring a predetermined minimum flow availability. The fluid controller includes a housing defining an inlet port for connection to the source of pressurized fluid, a control port for connection to the priority device, and an auxiliary port for connection to the auxiliary device. Valving is disposed in the housing of the controller and defines a neutral position, a normal operating position, and a maximum displacement position. The housing and the valving cooperate to define an auxiliary fluid path providing fluid communication from the inlet port to the auxiliary port and including a neutral variable orifice, having a maximum flow area when the valving is in the neutral position, and a decreasing flow area as the valving is displaced, through the normal operating position, toward the maximum displacement position. The housing and the valving further cooperate to define a main fluid path providing fluid communication from the inlet port to the control port and including a first flow control orifice.

The improved open-center fluid controller is characterized by the valving defining an auxiliary flow control orifice providing fluid communication from the inlet port to the auxiliary port when the valving approaches and is in the maximum displacement position. The auxiliary flow control orifice has a flow area operable to permit the predetermined minimum flow availability to the auxiliary device.

DETAILED DESCRIPTION OF THE PREFERRED EMBODIMENT

Figure 1:
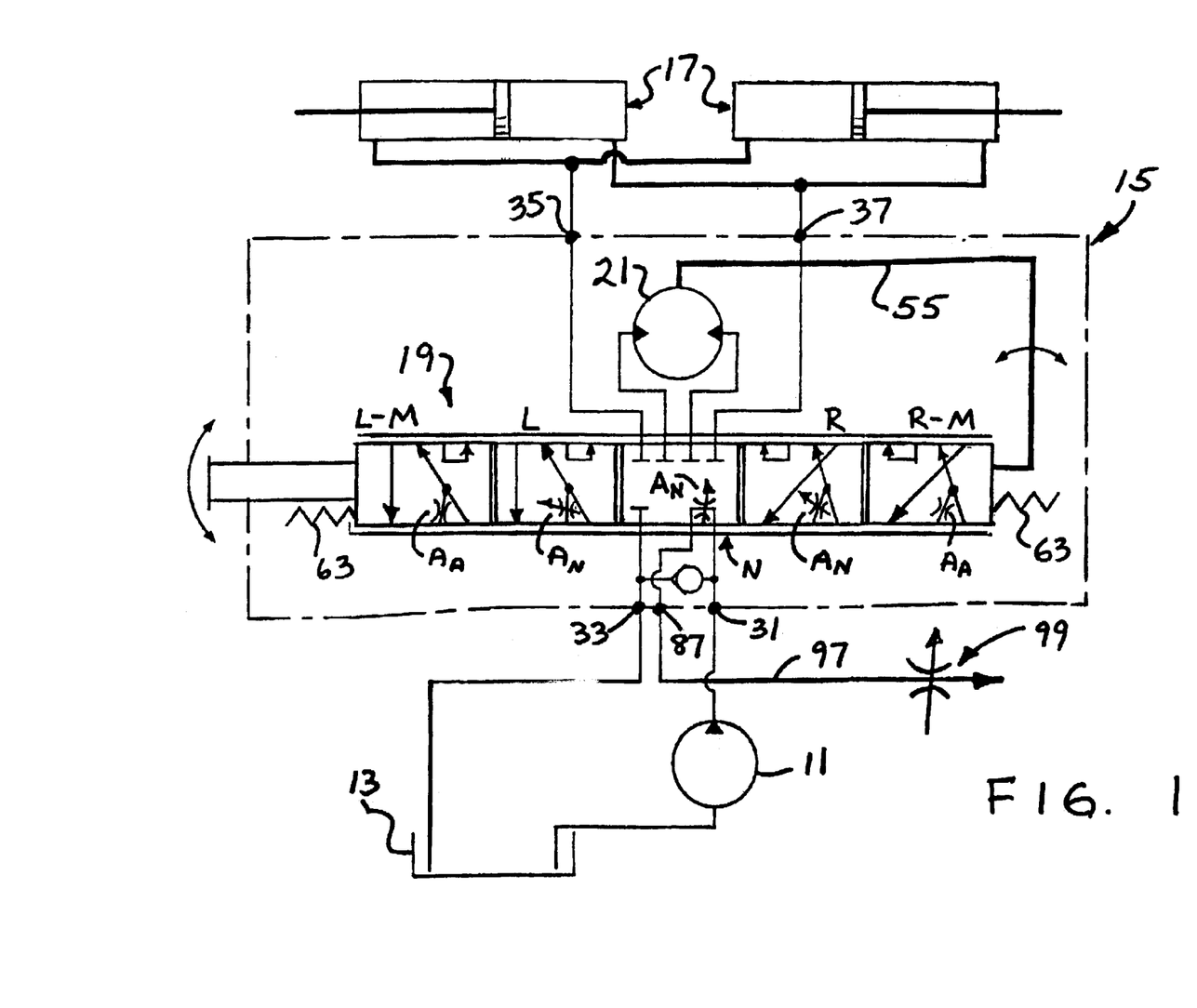
FIG. 1 is a hydraulic schematic of a vehicle hydraulic system including a fluid controller made in accordance with the present invention.

Referring now to the drawings, which are not intended to limit the invention, FIG. 1 is a hydraulic schematic of a vehicle hydraulic system, including a vehicle hydrostatic steering system and fluid controller made in accordance with the present invention. The vehicle hydraulic system includes a source of pressurized fluid, shown in FIG. 1 merely as a fixed displacement fluid pump 11 having its inlet connected to a system reservoir 13 in a manner well know to those skilled in the art.

Referring still to FIG. 1, the hydraulic system includes a fluid controller generally designated 15, which controls the flow of fluid from the pump 11 to a pair of steering cylinders 17, and although there are two of the steering cylinders 17 shown in FIG. 1, those skilled in the art will understand that the invention is not so limited. The fluid controller 15, which will be described in greater detail in conjunctions with FIG. 2, may be of the general type illustrated and described in U.S. Pat. Nos. Re 25,126 and 5,136,844, both of which are assigned to the assignee of the present invention and incorporated herein by reference.

Disposed within the fluid controller 15 is controller valving, generally designated 19, which is moveable from its neutral position (N) shown in FIG. 1, to either a right turn position (R) or a left turn position (L), either of which is considered a "normal operating position". In the subject embodiment, each of the right turn (R) and left turn (L) positions of the valving 19 is illustrated as having disposed adjacent thereto one additional position corresponding, respectively, to a right turn position with maximum valve displacement (R-M) and a left turn position with maximum valve displacement (L-M). For simplicity, references hereinafter to the various turn positions will bear the reference characters noted hereinabove, but without the parentheses.

When the valving arrangement 19 is in either the right turn position or the left turn position, and in either its normal operating position, R or L, or its maximum displacement position, R-M or L-M, pressurized fluid from the pump 11 flows through the valving 19, then flows through a fluid meter 21, one function of which is to measure (meter) the proper amount of fluid to be communicated to the steering cylinders 17. As is well know to those skilled in the art, the other function of the fluid meter 21 is to provide follow-up movement to the valving 19, such that the valving 19 is returned to its neutral position N after the desired amount of fluid has been communicated to the steering cylinder 17. This follow-up movement is achieved by a means which will be described in connection with the detailed description of FIG. 2.

Fluid Controller 15

Figure 2:
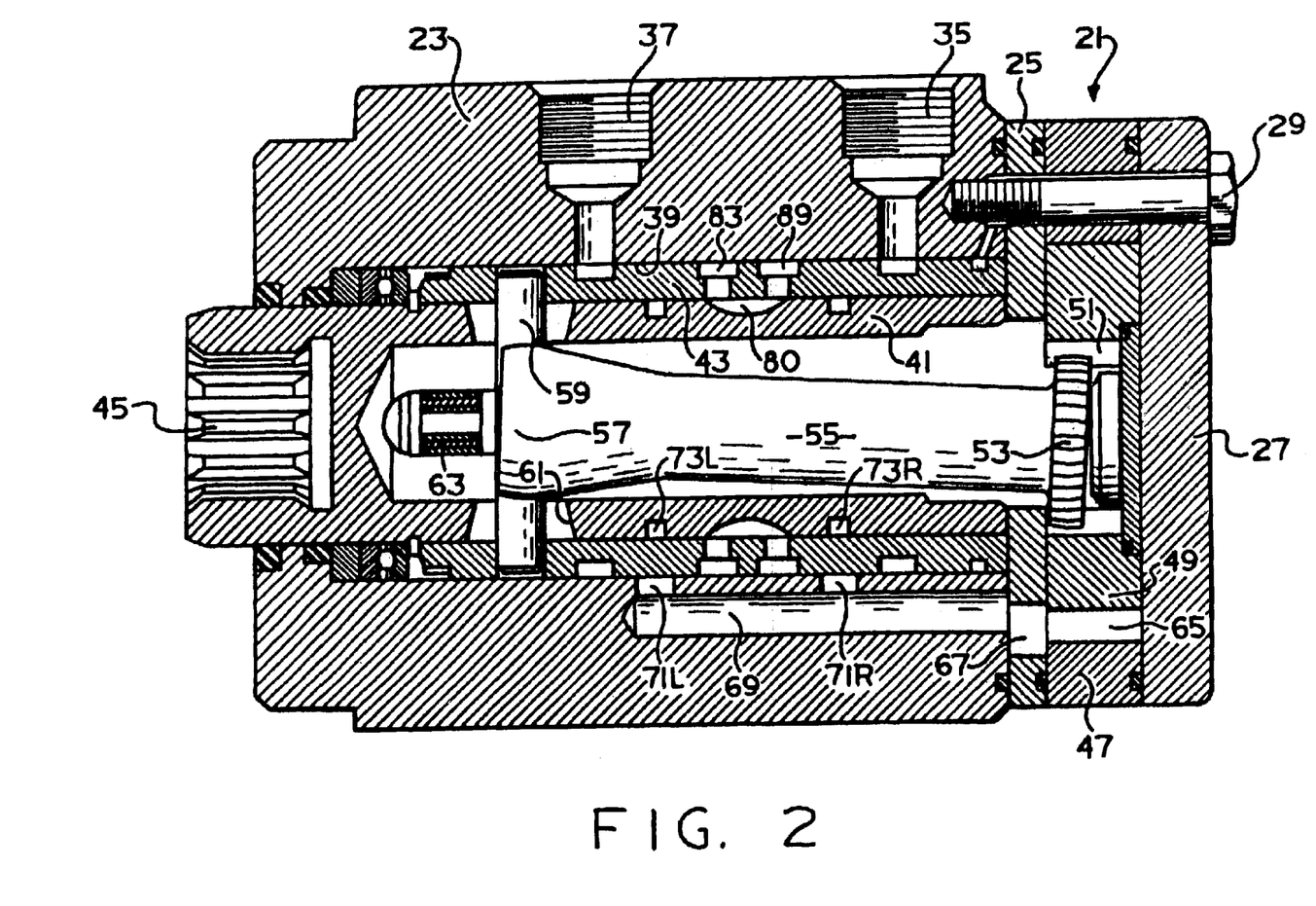
FIG. 2 is an axial cross-section of a fluid controller of the type with which the present invention may be utilized.

Referring now to FIG. 2, in conjunction with FIG. 1, the construction of the fluid controller 15 will be described in some detail. The fluid controller 15 comprises several sections, including a housing section 23, a port plate 25, a section comprising the fluid meter 21 and an end cap 27. These sections are held together in tight sealing engagement by means of a plurality of bolts 29 which are in threaded engagement with the housing section 23, only one of the bolts 29 being shown in FIG. 2. The housing section 23 defines an inlet port 31 and a return port 33 (both of which are shown only in FIG. 1), and a pair of control fluid ports 35 and 37.

The housing section 23 further defines a valve bore 39, and disposed rotatably therein is the controller valving 19, shown schematically in FIG. 1. The valving 19 comprises a primary, rotatable valve member 41 ("spool"), and a cooperating, relatively rotatable follow-up valve member 43 ("sleeve"). As is well know to those skilled in the art, the forward end (left end in FIG. 2) of the spool 41 includes a reduced diameter portion defining a set of internal splines 45 which provide for a direct mechanical connection between the spool 41 and a steering wheel (not shown). The spool 41 and sleeve 43 will be described in greater detail subsequently, in conjunction with FIGS. 3 through 5.

The fluid meter 21 may be of the type well known in the art, and includes an internally toothed stationary ring 47, and an externally toothed moveable star 49. The star 49 defines a set of internal splines 51, and in splined engagement therewith is a set of external splines 53 formed at the rearward end of a driveshaft 55. The driveshaft 55 has a bifurcated forward end 57 permitting driving connection between the shaft 55 and the sleeve 43, by means of a pin 59 passing through a pair of pin openings 61 (see also FIG. 3) in the spool 41. Thus, pressurized fluid flowing through the valving 19 in response to rotation of the spool 41 flows through the fluid meter 21, causing orbital and rotational movement of the star 49 within the ring 47. Such movement of the star 49 causes follow-up movement of the sleeve 43 by means of the drive shaft 55 and pin 59, to maintain a particular relative displacement between the spool 41 and the sleeve 43, proportional to the rate of rotation of the steering wheel. A plurality of leaf springs 63 extend through openings in the spool 41, biasing the sleeve 43 toward the neutral position N (see also FIG. 3), relative to the spool 41.

The toothed interaction of the star 49, orbiting and rotating within the ring 47, defines a plurality of expanding and contracting fluid volume chambers 65 (only one of which is shown in FIG. 2) and adjacent each volume chamber 65, the port plate 25 defines a fluid port 67. The housing section 23 defines a plurality of axial bores 69 (only one of which is shown in FIG. 2), each of which is in open communication with one of the fluid ports 67. The housing section 23 further defines a pair of radial bores 71L and 71R providing communication between each of the axial bores 69 and the valve bore 39, for reasons to be described subsequently.

Controller Valving 19

Figure 3:
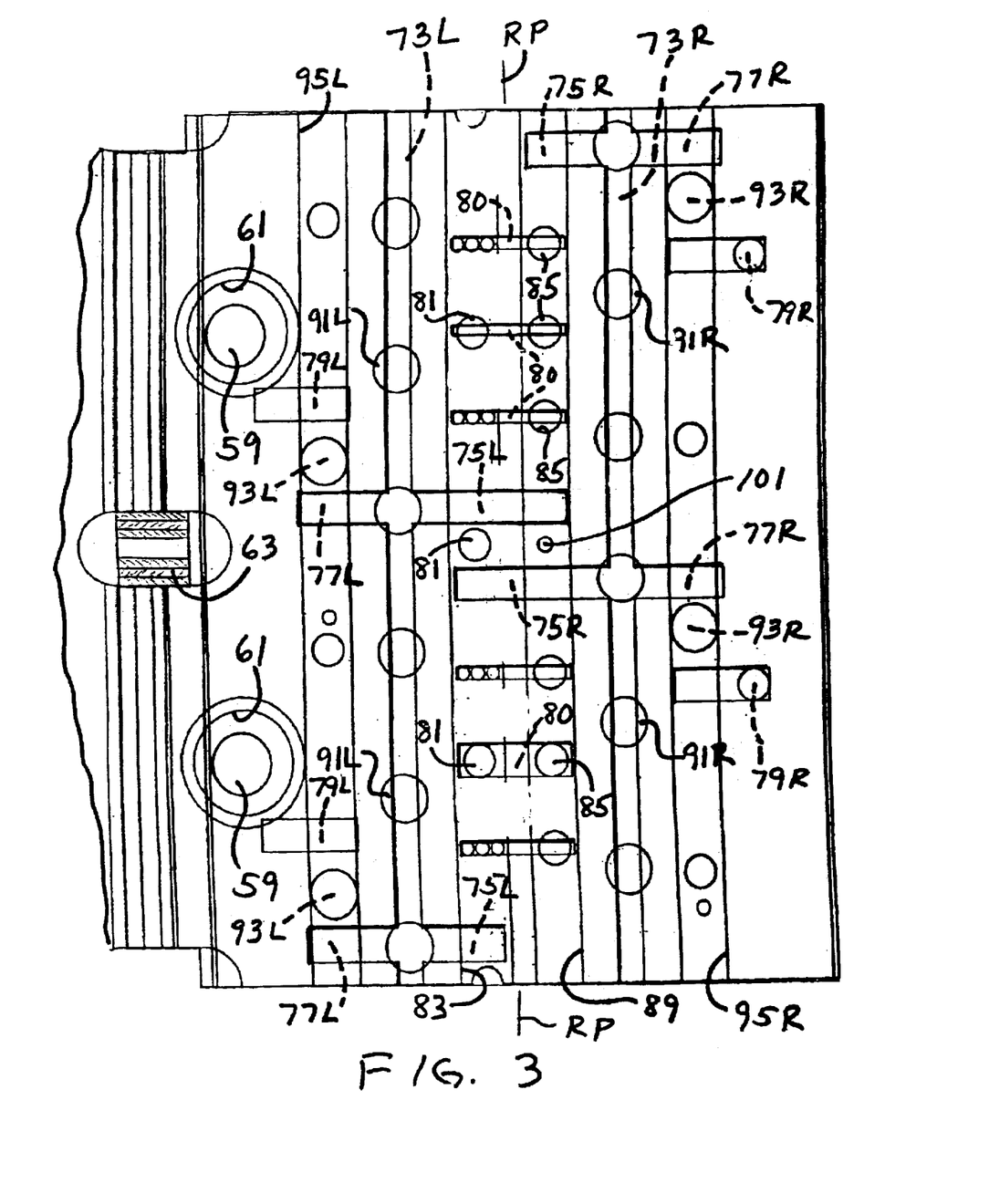
FIG. 3 is an overlay view of the valving of the fluid controller shown in FIGS. 1 and 2, but on a larger scale than in FIG. 2, and with the valving in its neutral position.

Referring now primarily to FIG. 3, the spool 41 and sleeve 43 will be described in detail. In connection with the subsequent description, it should be noted that many of the ports and passages are arranged symmetrically with respect to a central reference plane RP, and such elements will be described by a reference numeral followed by either an L or an R to indicate that the element is located on either the left side or the right side, respectively of the reference plane RP. On the other hand, certain of the elements do not have a corresponding element oppositely disposed about the reference plane RP, and will be referred to by use of a reference numeral alone. It should be understood that the overlay views of FIGS. 3 through 5 are intended to illustrate primarily the interface between the spool 41 and the sleeve 43, and as a result, may not show all of the various features defined on the outer surface of the sleeve 43.

Figure 4:
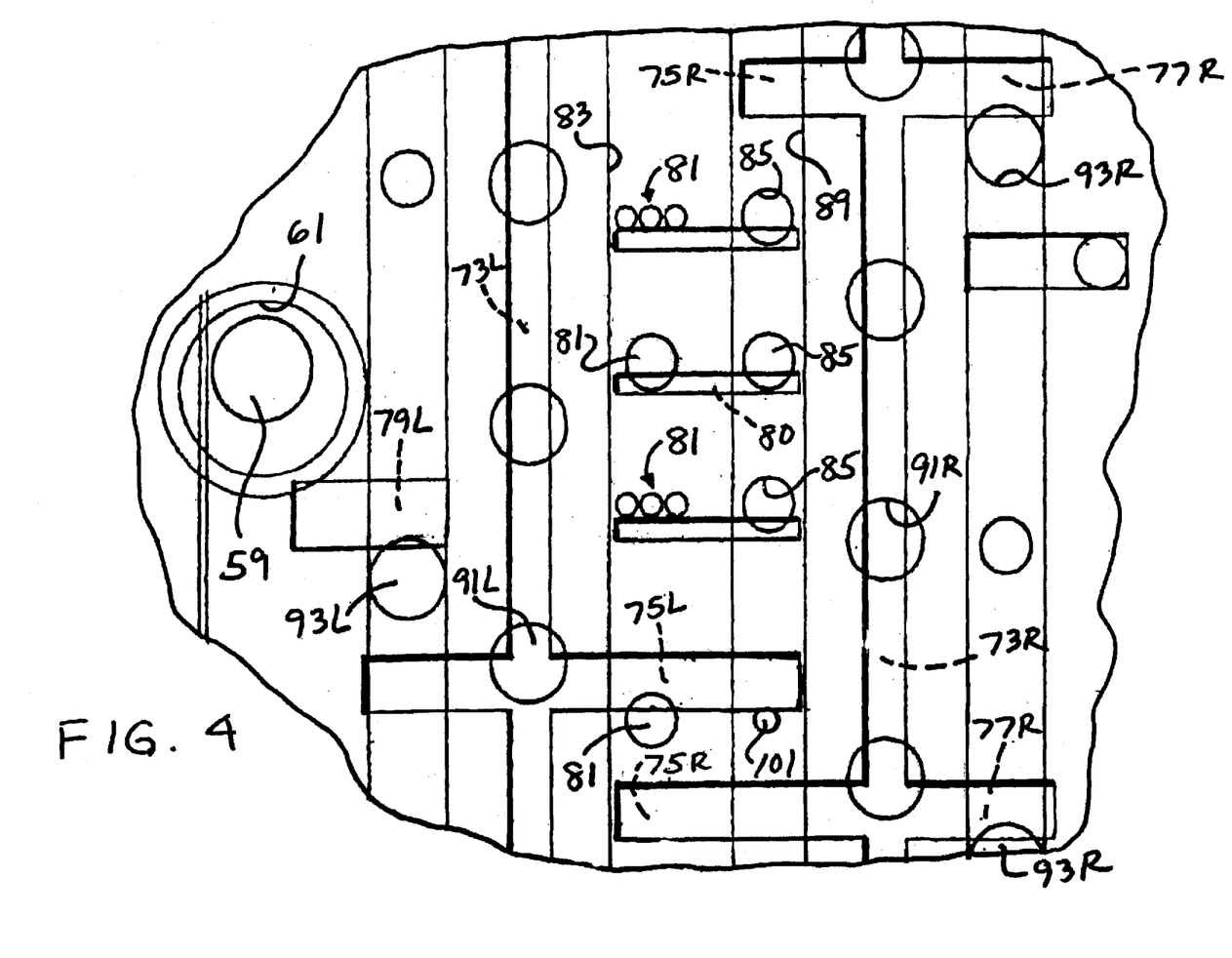
FIG. 4 is a further enlarged, fragmentary, overlay view, similar to FIG. 3, with the controller valving in a normal operating position.
Figure 5:
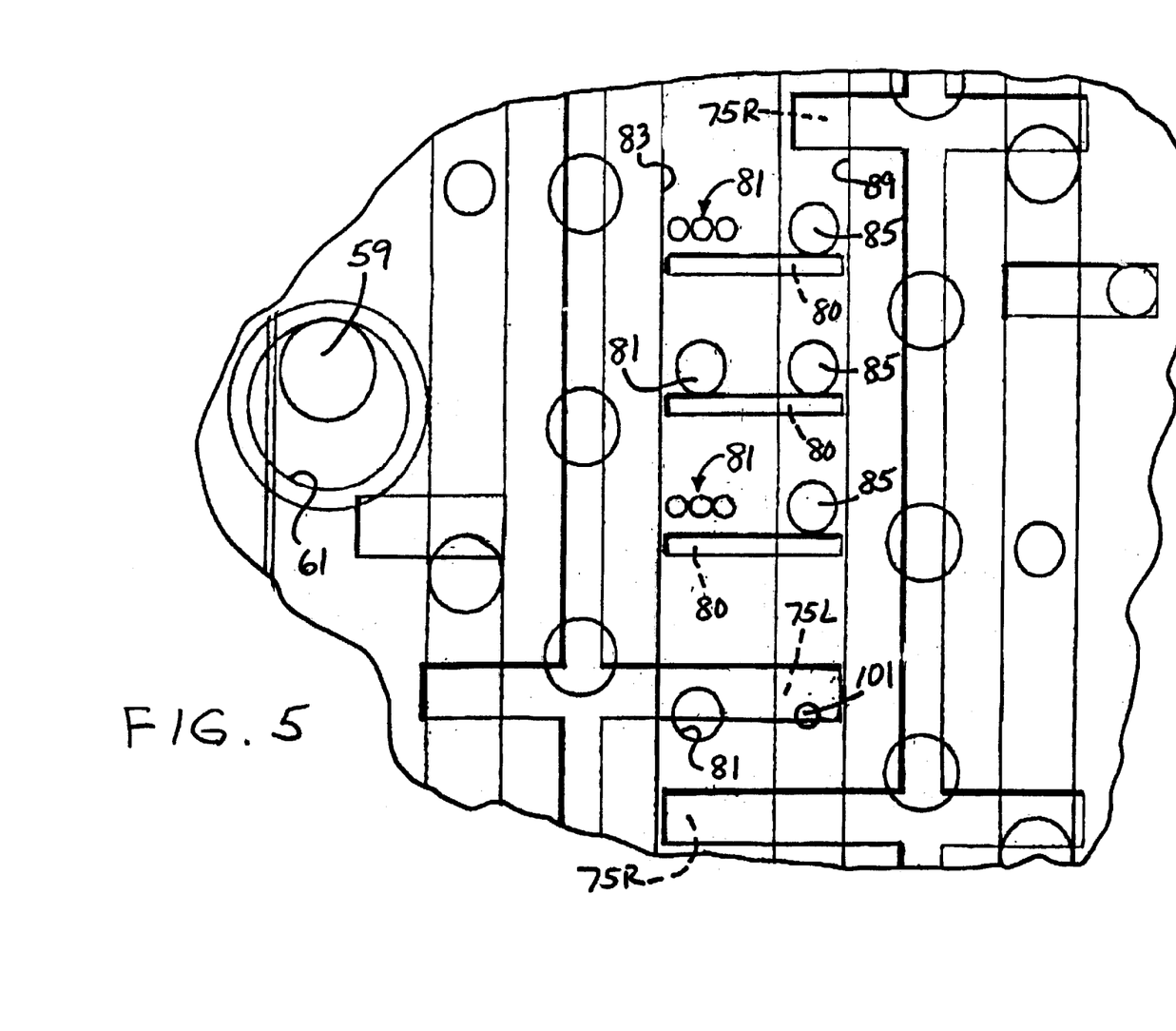
FIG. 5 is an enlarged, fragmentary, overlay view, similar to FIG. 4, but with the controller valving in its maximum displacement position.

In view of the fact that, in the overlay view of FIGS. 3 through 5, the spool 41 is "underneath" the sleeve 43, the elements of the spool 41 will bear reference numerals accompanied by dashed lead lines, whereas the elements of the sleeve 43 will bear reference numerals accompanied by solid lead lines. The spool 41 defines a pair of circumferential meter grooves 73L and 73R, which are approximately equally and oppositely disposed about the reference plane RP. In fluid communication with the meter groove 73L is a pair of pressure passages 75L, and in fluid communication with the meter groove 73R is a pair of pressure passages 75R. Also in fluid communication with the meter groove 73L is a pair of operating passages 77L, and in fluid communication with the meter groove 73R is a pair of operating passages 77R. In addition to the above-described grooves and passages which are formed on the outer surface of the spool 41, the spool also defines a plurality of tank ports 79L and a pair of tank ports 79R. The tank ports 79L and 79R are in fluid communication with the interior of the spool 41, 50 that low pressure, return fluid passes through the interior of the spool 41 and radially outward through the pin openings 61 which are in communication with the return port 33. Finally, the spool 41 defines a plurality of axial slots 80, the function of which will be described subsequently.

The sleeve 43 defines a plurality of pressure ports 81, which are disposed to be in continuous fluid communication with the inlet port 31 by means of an annular groove 83 (shown in both FIGS. 2 and 3) defined by the outer surface of the sleeve 43. It should be noted in FIGS. 3 through 5 that, in the subject embodiment, some of the pressure ports 81 comprise a single circular port, while others of the pressure ports 81 comprise a series (three herein) of smaller ports. Those skilled in the art will understand that various alternative forms of pressure ports 81 may be utilized, to achieve whatever shape is desired (see FIG. 6) for the neutral variable orifice $A_N$. Disposed to the right of the pressure ports 81 is a plurality of neutral ports 85, which are disposed to be in continuous fluid communication with a power beyond port 87 (see FIG. 1), by means of an annular groove 89 (again see both FIGS. 2 and 3), defined by the outer surface of the sleeve 43. Although the present invention is being illustrated and described in connection with one particular type of controller valving architecture, it should be understood by those skilled in the art that the present invention is not so limited.

Equally and oppositely disposed about the reference plane RP is a plurality of meter ports 91L, and a plurality of meter ports 91R, the meter ports 91L being in continuous fluid communication with the meter groove 73L, and the meter ports 91R being in continuous fluid communication with the meter groove 73R. At the same time, the meter ports 91L are disposed for commutating fluid communication with the radial bores 71L, while the meter ports 91R are disposed for communicating fluid communication with the radial bores 71R, in a manner well know to those skilled in the art. Equally and oppositely disposed about the reference plane RP is a pair of operating ports 93L, and a pair of operating ports 93R. With the controller valving 19 in the neutral position shown in FIGS. 1 and 3, each operating port 93L is approximately evenly disposed between an operating passage 77L and a tank port 79L. Similarly, each operating port 93R is approximately evenly disposed between an operating passage 77R and a tank port 79R. Each of the operating ports 93L is in continuous fluid communication with the control port 37, by means of an annular groove 95L, defined on the outer surface of the sleeve 43, while each of the operating ports 93R is in continuous fluid communication with the control port 35 by means of an annular groove 95R, also defined on the outer surface of the sleeve 43.

Operation of Valving

It is believed that the basic operation of the fluid controller 15 and of the controller valving 19 described thus far should be readily apparent in view of the teachings of the above-incorporated patents. However, the operation of the controller and valving will be described briefly hereinafter, partly as background for the description of the present invention.

Referring still primarily to FIG. 3, when the controller valving 19 is in the neutral position (no rotation of the steering wheel), pressurized fluid is communicated from the inlet port 31 into the annular groove 83, and then through the pressure ports 81. In the neutral position of the valving, all of the pressure ports 81 are in open communication with an adjacent axial slot 80, such that pressurized fluid flows through the slot 80, then through the respective neutral ports 85 and into the annular groove 89. From the groove 89, pressurized fluid flows to the power beyond port 87 and then (referring now to FIG. 1), power beyond fluid flows through a conduit 97 to a downstream, fluid pressure operated auxiliary device (power beyond device), illustrated schematically in FIG. 1 merely as a variable orifice, designated 99.

The cumulative overlap of the various pressure ports 81 with the axial slots 80, as well as the cumulative overlap of the slots 80 with the neutral ports 85, comprises the variable neutral orifice $A_N$ which, as may best be seen in FIG. 6 has its maximum orifice area when the valve displacement is zero degrees (the neutral position N) and the area of the $A_N$ orifice decreases as the valving 19 is displaced away from the neutral position, as will be described in greater detail subsequently. In the subject embodiment, the particular configuration of larger and smaller pressure ports 81 will result in the area of the variable neutral orifice $A_N$ dropping rather quickly during about the first five degrees of spool-sleeve displacement, as the small ports 81 move out of communication with the axial slots 80. Thereafter, the area of the variable neutral orifice $A_N$ will decrease more slowly as the large ports 81 gradually move out of communication with the axial slots 80.

Referring now primarily to FIG. 4, when, for example, the steering wheel is rotated clockwise, for a right turn (normal operating position R in FIG. 1), the pressure ports 81 which were overlapping the axial slots 80 begin to move out of fluid communication therewith, thus decreasing the orifice area of the variable neutral orifice $A_N$, as was described previously. One result of this decrease in the area of the variable neutral orifice $A_N$, in a typical vehicle hydraulic system of the type shown in FIG. 1, is that the pressure begins to build in the annular groove 83.

Figure 6:
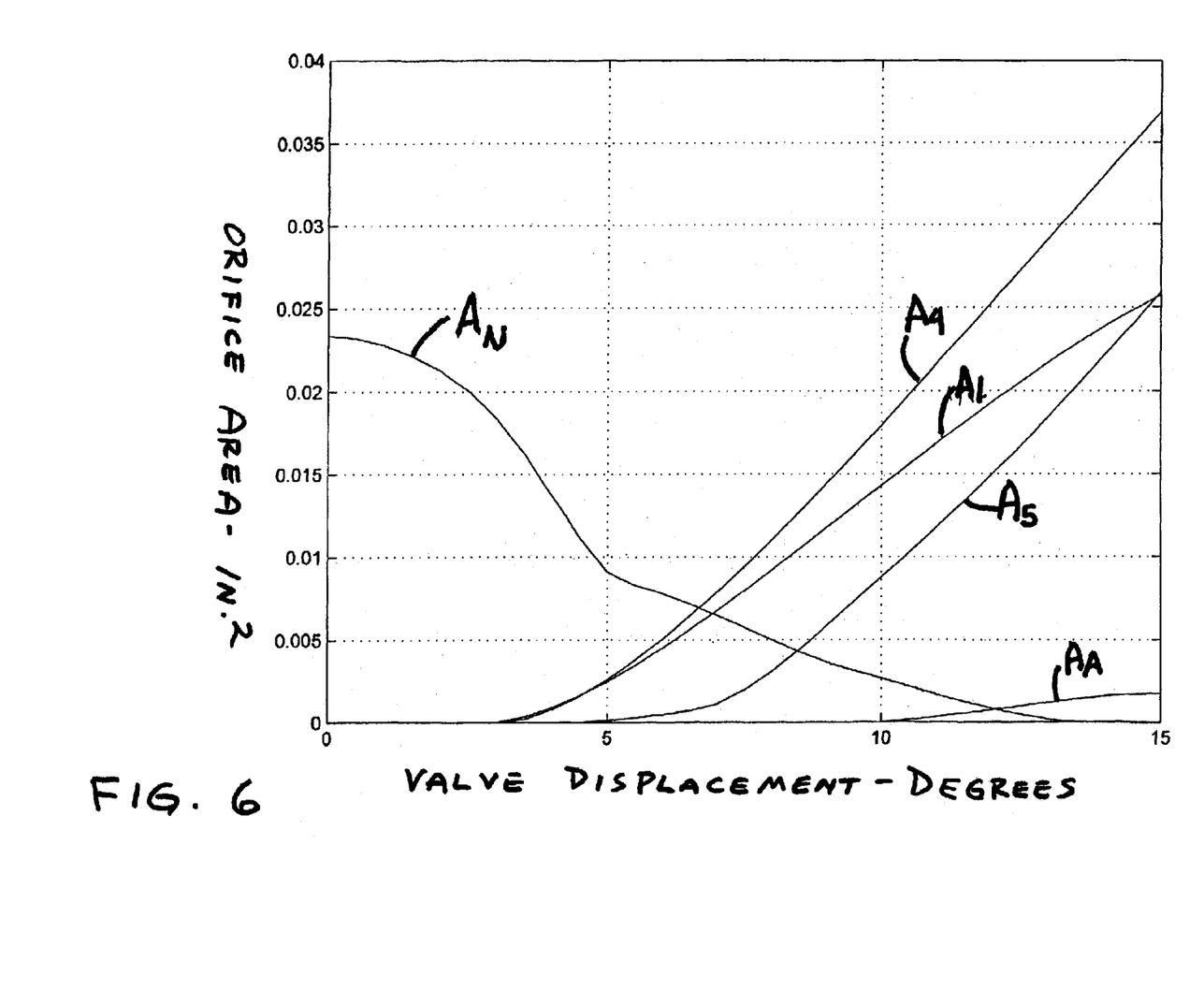
FIG. 6 is a graph of orifice area (in square inches) versus valve displacement (in degrees), illustrating one important aspect of the present invention.

With the controller valving 19 in the position shown in FIG. 4, the other pressure ports 81 (i.e., those which were not previously overlapping one of the axial slots 80) have begun to overlap the adjacent pressure passages 75L, the cumulative overlap therebetween comprising a first, or main, flow control orifice A1 (see FIG. 6). It should be noted that, for ease of illustration, the A1 orifice is not shown at all in FIG. 1, but those skilled in the art of open-center fluid controllers understand that the A1 and $A_N$ orifices are basically in parallel, once the valving 19 is away from the neutral position N. Pressurized fluid flows from each of the pressure passages 75L into the respective meter groove 73L, then radially outward through the meter ports 91L. This pressurized, unmetered fluid is then communicated to the fluid meter 21 in the manner described previously, then returns from the fluid meter 21 as pressurized, metered fluid. This metered fluid flows through the meter ports 91R into the meter groove 73R, and from there through the operating passages 77R. The metered fluid then flows through the respective operating ports 93R, the cumulative overlap between the passages 77R and the ports 93R comprising a variable flow control orifice A4 (see FIG. 6).

Metered fluid flowing through the operating ports 93R then flows to the control fluid port 35, then to the steering cylinders 17. Fluid which is exhausted from the cylinders 17 is communicated through the control fluid port 37 to the operating ports 93L, which now overlaps the tank ports 79L, the cumulative area of overlap therebetween comprising a variable flow control orifice A5. The flow path described above will be referred to hereinafter as the "main fluid path" and it should be noted by reference to FIGS. 1 and 3 that, if the spool 41 is displaced relative to the sleeve 43, in the opposite direction, so that the valving 19 is in the left turn position L, the flow through the valving will be in the "opposite" direction and will flow to the control fluid port 37, then to the steering cylinders 17, returning to the control fluid port 35.

The structure and function described up to this point is generally well known to those skilled in the art. Referring now primarily to FIG. 5, the improvement of the present invention will be described in detail. It may be seen, by again viewing FIG. 3, that in accordance with one aspect of the present invention, the pressure passages 75L and 75R, which are disposed adjacent the springs 63, extend further axially than do the diametrically opposite pressure passages 75L and 75R. The reason for this difference will now be described. Referring again primarily to FIG. 5, it may be seen that the valving is in its maximum displacement position (R-M) in a right turn, as is illustrated by the location of the pin 59 within the pin opening 61. Also, it may be seen in FIG. 5 that each of the neutral ports 85 has now passed beyond, and is out of fluid communication with, its respective axial slot 80. Therefore, and in accordance with conventional practice, the variable neutral orifice $A_N$ has now decreased to a zero orifice area (see FIG. 6, in which the graph labeled "$A_N$" reaches a zero flow area at about 13 degrees of valve displacement, wherein about 15 degrees is the maximum possible displacement).

However, in accordance with the present invention, the spool 43 is provided with an auxiliary fluid port 101. When the controller valving 19 is in the neutral position of FIG. 3, the auxiliary fluid port 101 is disposed evenly between the pressure passages 75L and 75R, and even when the valving is in a normal operating condition (R in FIG. 1) as shown in FIG. 4, the auxiliary port 101 still does not have any substantial fluid communication with the adjacent pressure passage 75L. However, when the controller valving 19 has been displaced to and beyond about 10 degrees, and then approaches the maximum position (R-M in FIG. 1), the auxiliary fluid port 101 is now in open communication with the pressure passage 75L, the overlap therebetween defining an auxiliary flow control orifice $A_A$. Thus, pressurized, unmetered fluid in the pressure passage 75L flows through the $A_A$ orifice into the annular groove 89, and from there out the power beyond port 87 through the conduit 97 to the auxiliary device 99. Therefore, just as the variable neutral orifice $A_N$ is closing off completely, as the valving reaches the maximum displacement position (R-M of FIG. 1), the auxiliary orifice $A_A$ opens, and provides just enough pressurized fluid to the downstream auxiliary device 99 to sustain operation, or maintain at least a minimum level of operation.

Those skilled in the art will understand that one important aspect of implementing this invention is to determine, for each particular downstream auxiliary device 99 which is being utilized, just what predetermined minimum flow availability (i.e., pressure and flow) is required for the particular auxiliary device to achieve the desired object (e.g., to prevent a mower deck from dropping, or to keep a winch rotating at some predetermined minimum speed, etc.). Subsequently, the auxiliary fluid port 101 should be sized to provide the desired minimum flow and pressure to the auxiliary device. Although the present invention has been illustrated and described in connection with an embodiment in which a separate auxiliary fluid port 101 is provided, to comprise the auxiliary orifice $A_A$, those skilled in the art will understand that it would also be possible, and within the scope of the present invention, to modify either one of the axial slots 80 or one of the neutral ports 85, or both, to provide the desired orifice area versus valve displacement illustrated in FIG. 6, and identified by the separate $A_N$ and $A_A$ curves.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

What is claimed is:

1. An open-center fluid controller operable to control the flow of fluid from a source of pressurized fluid to a fluid pressure operated priority device and to a downstream fluid pressure operated auxiliary device requiring a predetermined, minimum flow availability; said fluid controller including a housing defining an inlet port for connection to the source of pressurized fluid, a control port for connection to said priority device, and an auxiliary port for connection to said auxiliary device; valving disposed in said housing and defining a neutral position, a normal operating position, and a maximum displacement position; said housing and said valving cooperating to define an auxiliary fluid path providing fluid communication from said inlet port to said auxiliary port and including a neutral variable orifice, having a maximum flow area when said valving is in said neutral position, and a decreasing flow area as said valving is displaced through said normal operating position toward said maximum displacement position; said housing and said valving further cooperating to define a main fluid path providing fluid communication from said inlet port to said control port, and including a first flow control orifice, said controller being characterized by:

(a) said valving defining an auxiliary flow control orifice providing fluid communication from said inlet port to said auxiliary port when said valving approaches and is in said maximum displacement position; and (b) said auxiliary flow control orifice having a flow area operable to permit said predetermined minimum flow availability to said auxiliary device.

2. An open-center fluid controller as claimed in claim 1, characterized by said first flow control orifice having a minimum flow area when said valving is in said neutral position, and an increasing flow area as said valving is displaced through said normal operating position toward said maximum displacement position.

3. An open-center fluid controller as claimed in claim 1, characterized by fluid actuated means for imparting follow-up movement to said valving, tending to return said valving from said normal operating position toward said neutral position, said follow-up movement being proportional to the volume of fluid flow through said main fluid path.

4. An open-center fluid controller as claimed in claim 1, characterized by said valving comprising a primary, rotatable valve member and a cooperating, relatively rotatable follow-up valve member, surrounding said primary valve member, said primary valve member defining a pressure passage in fluid communication with said inlet port when said valving is displaced from said neutral position, said follow-up valve member defining an auxiliary fluid port in continuous fluid communication with said auxiliary port defined by said housing, said auxiliary fluid port and said pressure passage beginning to overlap to define said auxiliary flow control orifice only as said valving approaches said maximum displacement position.

5. An open-center fluid controller as claimed in claim 1, characterized by said valving comprising a primary, rotatable valve member and a cooperating, relatively rotatable follow-up valve member, surrounding said primary valve member, said primary valve member defining an axial slot in fluid communication with said inlet port when said valving is in said neutral position, said follow-up valve member defining at least one neutral port in continuous fluid communication with said auxiliary port, said axial slot being overlapped by said neutral port when said valving is in said neutral position to define said neutral variable orifice, said axial slot being out of fluid communication with said neutral port when said valving reaches said maximum displacement position.

* * * * *